United States Patent
Moon et al.

(10) Patent No.: US 7,593,338 B2
(45) Date of Patent: Sep. 22, 2009

(54) CONGESTION CONTROL METHOD AND SYSTEM FOR REDUCING A RETRANSMISSION TIMEOUT COUNT IN A TRANSMISSION CONTROL PROTOCOL

(75) Inventors: Sang-Jun Moon, Yongin-si (KR); Dong-Min Kim, Seoul (KR); Beom-Joon Kim, Seoul (KR); Jai-Yong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 818 days.

(21) Appl. No.: 10/875,286

(22) Filed: Jun. 25, 2004

(65) Prior Publication Data

US 2004/0264370 A1   Dec. 30, 2004

(30) Foreign Application Priority Data

Jun. 27, 2003   (KR) ............... 10-2003-0042720

(51) Int. Cl.
*H04J 1/16* (2006.01)
(52) U.S. Cl. ............... 370/235; 370/236; 370/252
(58) Field of Classification Search ......... 370/432, 370/390, 352, 229, 230, 230.1, 231, 232, 370/235, 235.1, 236, 252; 709/235
See application file for complete search history.

(56) References Cited

U.S. PATENT DOCUMENTS

| 2002/0054570 A1* | 5/2002 | Takeda ............... 370/252 |
| 2002/0150048 A1* | 10/2002 | Ha et al. ............. 370/231 |
| 2003/0117974 A1* | 6/2003 | Kang ................ 370/328 |

* cited by examiner

*Primary Examiner*—Ricky Ngo
*Assistant Examiner*—Dady Chery
(74) *Attorney, Agent, or Firm*—Roylance, Abrams, Berdo & Goodman, L.L.P.

(57) ABSTRACT

A congestion control method and system in a communication system that transmits and receives a data segment using Transmission Control Protocol (TCP) and performs a Fast Retransmit mode and a Fast Recovery mode upon occurrence of a lost segment. A transmission terminal retransmits the lost segment to a reception terminal and then calculates the expected number of duplicate acknowledgements (ACKs) expected to be received from the reception terminal. The transmission terminal determines whether an ACK recently received from the reception terminal is identical to a new ACK or a duplicate ACK. The transmission terminal accumulates the received duplicate ACK, and compares the number of the accumulated duplicate ACKs with the expected number of the duplicate ACKs. The transmission terminal retransmits the lost segment to the reception terminal if the number of the accumulated duplicate ACKs is larger than the expected number of the duplicate ACKs.

22 Claims, 5 Drawing Sheets

CONGESTION CONTROL METHOD AND SYSTEM FOR REDUCING A RETRANSMISSION TIMEOUT COUNT IN A TRANSMISSION CONTROL PROTOCOL

PRIORITY

This application claims the benefit under 35 U.S.C. § 119 (a) of an application entitled "Congestion Control Method for Reducing Retransmission Timeout Count in Transmission Control Protocol" filed in the Korean Intellectual Property Office on Jun. 27, 2003 and assigned Serial No. 2003-42720, the contents of which are incorporated herein by reference.

BACKGROUND OF THE INVENTION

1. Field of the Invention

The present invention relates generally to a congestion control method and system in a communication system using Transmission Control Protocol (TCP). In particular, the present invention relates to a congestion control method and system for preventing deterioration in transmission performance due to a retransmission timeout during congestion control in Transmission Control Protocol.

2. Description of the Related Art

Request For Comments (RFC) 793 published by Internet Engineering Task Force (IETF), an Internet standardization organization, provides Transmission Control Protocol (TCP) as a protocol for transmitting data over the Internet. Transmission Control Protocol is used to exchange data between nodes connected to the Internet in the form of a packet. Because Transmission Control Protocol operates as a protocol for a transport layer in an upper layer for Internet Protocol (IP) operating in a network layer, it is commonly called "TCP/IP."

Transmission Control Protocol (TCP), like User Datagram Protocol (UDP), uses Internet Protocol (IP) for a network layer, but it provides a connection-oriented service and a reliable byte-stream service, fundamentally different from services provided by UDP. TCP is a protocol for controlling a rate of a transmission terminal by taking a congestion status of a network into account, and can be used for a transport layer even in a future wire/wireless integrated network. TCP forms one loop having a transmission terminal and a reception terminal as network terminations, and implements a congestion control mechanism using acknowledgement (ACK) information transmitted to acknowledge data reception to the loop, a window size notification to a transmission terminal by a reception terminal, and a timeout function.

Tahoe, Reno, and Newreno TCPs are commonly in use. In TCP communication, when a data segment is received from a transmission terminal, a reception terminal transmits an ACK having the same sequence number as a sequence number of the received data segment. The term "data segment" refers to a unit of a data block transmitted with TCP, referred to as a protocol data unit (PDU). In the TCP communication, a transmission terminal simultaneously transmits as many data segments as a predetermined number, referred to as a congestion window (CWND), even though it fails to receive the ACK from a reception terminal. However, if the transmission terminal receives an ACK having the same sequence number, (duplicate ACKs), it retransmits a data segment having a corresponding sequence number. Even through the transmission terminal does not receive the duplicate ACK, if it fails to receive an ACK for a predetermined timeout period after transmitting a data segment to the reception terminal, the transmission terminal retransmits the data segment.

In a conventional loss recovery process for the Newreno TCP, when a retransmitted data segment is lost again, a transmission terminal continuously receives only a duplicate ACK for the segment lost during retransmission rather than an ACK indicative of successful reception of the retransmitted segment, avoidably causing a retransmission timeout. As a segment loss probability becomes higher, the number of segments lost within one window increases, and in a process of retransmitting lost segments, because the loss probability is increases, the conventional loss recovery of the Newreno TCP may considerably decrease transmission performance in an environment having a high loss rate.

Newreno TCP is specified such that a transmission terminal transmits new segments each time it receives a duplicate ACK after retransmitting a corresponding segment in response to duplicate ACKs. When a recently, transmitted segment is lost, the transmission terminal must retransmit the recently transmitted segment upon a timeout or upon reception of duplicate ACKs for the recently transmitted segment. However, in Newreno TCP, when a lost segment is retransmitted, a size of a congestion window is reduced to half due to retransmission of a previous segment. Therefore, the transmission terminal may fail to receive duplicate ACKs sufficient to retransmit a recently lost segment, undesirably causing a retransmission timeout.

For a retransmission timeout, a timer having a relatively long time measurement of, for example, 500 ms is used, so a time for which a transmission terminal transmits a data segment and then waits for an ACK in response thereto is relatively long. Therefore, the transmission terminal cannot perform any operation on a lost segment for a long period even a status of a link becomes excellent due to the retransmission timeout, resulting in a waste of transmission bandwidth. Accordingly, there is a demand for a method for reducing retransmission timeout probability in Transmission Control Protocol.

SUMMARY OF THE INVENTION

It is, therefore, an object of the present invention to provide a method and system for recovering a lost data segment retransmitted in Transmission Control Protocol (TCP)-based communication, without a timeout.

It is another object of the present invention to provide a method and system for reducing the probability that a timeout will occur when a recently transmitted segment is lost after a duplicate acknowledgement (ACK) was received in TCP-based communication.

In accordance with one aspect of the present invention, there is provided a congestion control method in a communication system that transmits and receives a data segment using Transmission Control Protocol (TCP) and performs a Fast Retransmit mode and a Fast Recovery mode upon occurrence of a lost segment. In the method and system, a transmission terminal retransmits the lost segment to a reception terminal and then calculates the expected number of duplicate ACKs expected to be received from the reception terminal. The transmission terminal determines whether an ACK currently received from the reception terminal is identical to a new ACK or a duplicate ACK. The transmission terminal accumulates the received duplicate ACK, and compares the number of the accumulated duplicate ACKs with the expected number of the duplicate ACKs. The transmission terminal retransmits the lost segment to the reception terminal if the number of the accumulated duplicate ACKs is larger than the expected number of the duplicate ACKs.

In accordance with another aspect of the present invention, there is provided a congestion control method and system in a communication system that transmits and receives a data segment using Transmission Control Protocol (TCP) and performs a Fast Retransmit mode and a Fast Recovery mode upon occurrence of a lost segment. In the method and system, a transmission terminal initializes a recovery sequence number for determining whether the Fast Recovery mode ends to a maximum value of segment numbers counted until a start point of the Fast Retransmit mode. The transmission terminal receives an ACK indicating whether a segment is received from a reception terminal. The transmission terminal updates the recovery sequence number to a maximum number among sequence numbers of segments transmitted to the reception terminal until a reception point of the ACK, if the ACK is a partial ACK, a sequence number of the ACK being smaller than the recovery sequence number.

In accordance with further another aspect of the present invention, there is provided a system for congestion control in a communication system that transmits and receives a data segment using Transmission Control Protocol (TCP) and performs a Fast Retransmit mode and a Fast Recovery mode upon occurrence of a lost segment. The system comprises a reception terminal, and; a transmission terminal is adapted to retransmit the lost segment to the reception terminal and calculate the expected number of duplicate acknowledgements (ACKs) expected to be received from the reception terminal, determine whether an ACK currently received from the reception terminal is identical to a new ACK or a duplicate ACK, accumulate the received duplicate ACK, compare the number of the accumulated duplicate ACKs with the expected number of the duplicate ACKs, and retransmit the lost segment to the reception terminal if the number of the accumulated duplicate ACKs is larger than the expected number of the duplicate ACKs.

BRIEF DESCRIPTION OF THE DRAWINGS

The above and other objects, features and advantages of the present invention will become more apparent from the following detailed description when taken in conjunction with the accompanying drawings in which.

Throughout the drawings, it should be noted that the same or similar elements are denoted by like reference numerals.

DETAILED DESCRIPTION OF THE PREFERRED EMBODIMENTS

Embodiments of the present invention will now be described in detail with reference to the accompanying drawings. In the following description, a detailed description of known functions and configurations incorporated herein has been omitted for conciseness.

An embodiment of the present invention will be described herein below with reference to a packet data transmission system that partially includes a radio network.

Figure 1:
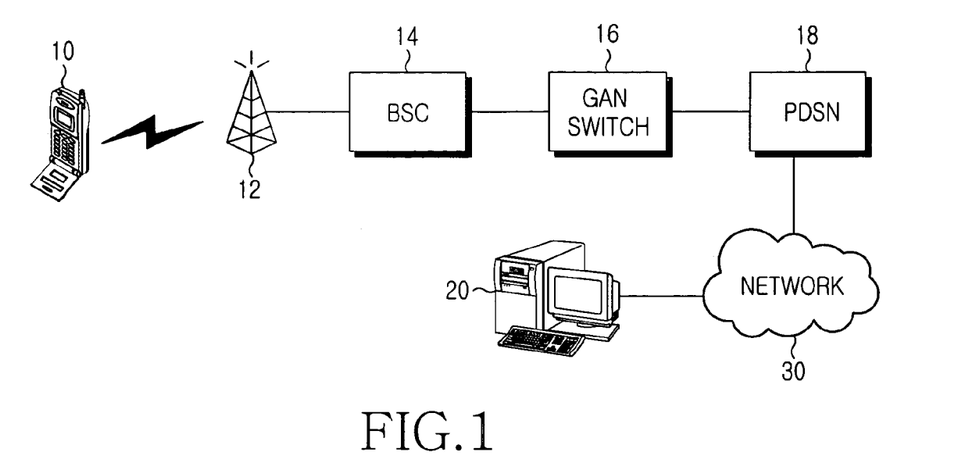
FIG. 1 is a block diagram illustrating a configuration of a packet data transmission system according to an embodiment of the present invention.

FIG. 1 is a block diagram illustrating a configuration of a packet data transmission system according to an embodiment of the present invention. Referring to FIG. 1, a packet data transmission system includes a base transceiver subsystem (BTS) 12 that services a mobile terminal 10 through a radio channel, a base station controller (BSC) 14 for controlling the base transceiver subsystem 12, and a Global Asynchronous Transfer Mode (ATM) Network (GAN) switch 16 for connecting the base station controller 14 to a packet network 30 via a packet data service node (PDSN) 18. In this system, the mobile terminal 10 exchanges data with a computer apparatus 20 that accesses the packet network 30.

The mobile terminal 10 can be a notebook computer connected to a cellular phone or a Personal Communications Service (PCS) phone, or a Personal Digital Assistant (PDA) phone or an International Mobile Telecommunication-2000 (IMT-2000) terminal capable of performing Internet communication, and the computer apparatus 20 can be a web server or a File Transfer Protocol (FTP) server. The computer apparatus 20 provides a file requested by a user to the mobile terminal 10 using data segments. The data segments include sequence numbers for sequence ordering of the data segments. The computer apparatus 20 serves as a transmission terminal and the mobile terminal 10 serves as a reception terminal.

Figure 2:
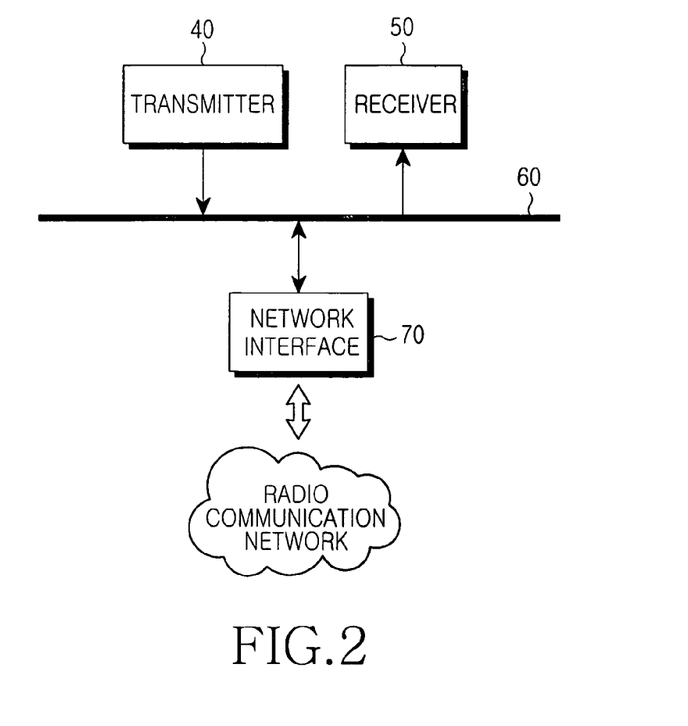
FIG. 2 is a block diagram illustrating a structure of the communication terminal illustrated in FIG. 1.

FIG. 2 is a block diagram illustrating a structure of the communication terminal illustrated in FIG. 1. The structure is applied to the mobile terminal 10 and the computer apparatus 20 illustrated in FIG. 1.

Referring to FIG. 2, a communication node includes a transmitter 40, a receiver 50, a network interface 70, and a bus 60 connecting the elements to each other. The receiver 50 receives data segments transmitted from a transmission side via a communication line, and analyzes packets in the data segments. The transmitter 40 converts transmission data into a data segment in a predetermined format, and transmits the data segment to a reception side's node via a communication line.

Although FIG. 1 illustrates a transmission terminal serving as a mobile terminal, a reception terminal serving as a web server or an FTP server, and a plurality of apparatuses for connecting the transmission terminal to the reception terminal, the embodiments of the present invention are not limited to such a structure. That is, it should be obvious to those skilled in the art that the embodiments of the present invention can be applied to any data transmission system without departing from the spirit and scope of the present invention.

In the communication terminal, the transmitter 40 transmits data segments generated by segmenting transmission files to the receiver 50. Communication in the packet network 30 based on Internet Protocol (IP) is commonly performed using Transmission Control Protocol (TCP).

Figure 3:
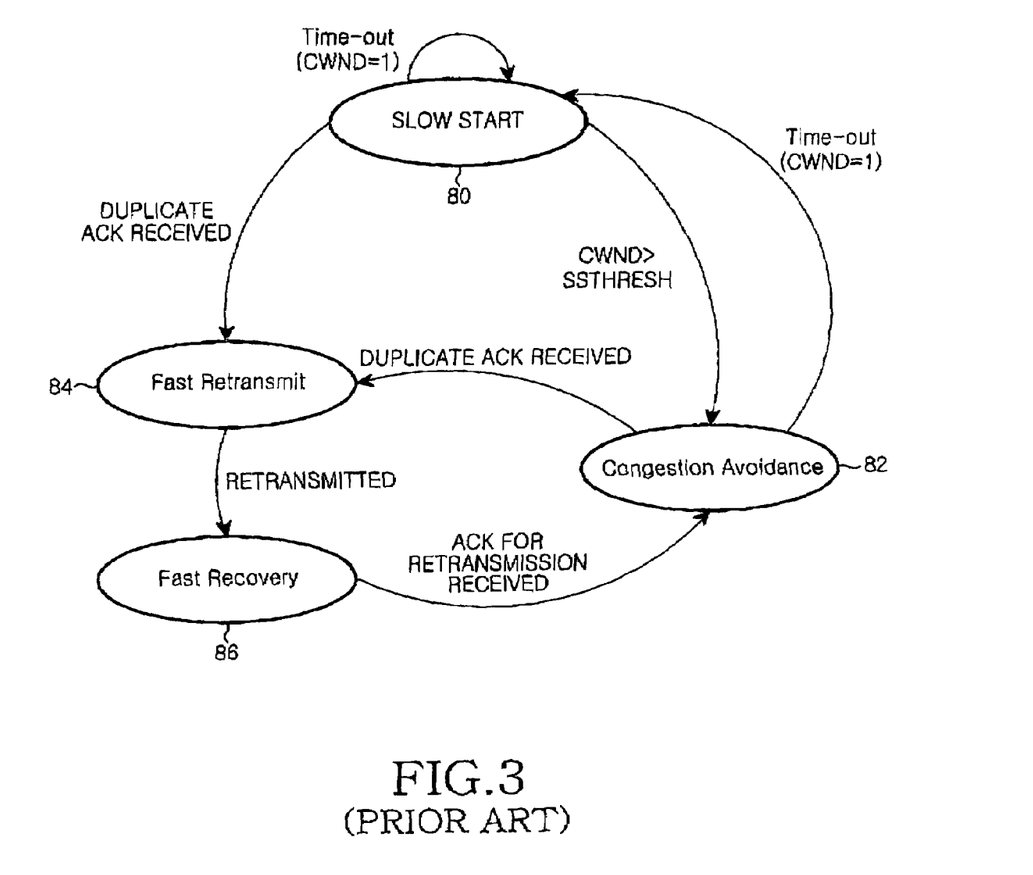
FIG. 3 is a diagram illustrating a conventional operation for Transmission Control Protocol (TCP) congestion control.

FIG. 3 is a diagram illustrating a conventional congestion control operation using Transmission Control Protocol. As illustrated in FIG. 3, TCP congestion control fundamentally includes a Slow Start mode 80 and a congestion avoidance mode 82.

The Slow Start 80 is provided to prevent segments from being discarded due to storage limitations in router buffer capacity when a plurality of segments simultaneously arrive at a router located in a network. Even if a transmission bandwidth of the network is large enough to accommodate all transmission segments, segments may not be transmitted from routers to a destination node because the segments are burst traffic. The Slow Start 80 is an algorithm for stably controlling the transmission capacity of segments using a congestion window (CWND) in a transmission terminal in order to prevent the above problem.

The CWND is used when TCP is initially connected and timeout occurs. The CWND ends if the CWND is larger than a Slow Start threshold (SSTHRESH) or a transmitter terminal receives a predetermined number of duplicate acknowledgements (ACKs) (generally 3 duplicate ACKs), thereby detecting a loss of a segment transmitted to a reception terminal. The duplicate ACK represents an ACK that the reception terminal generates using the same sequence number when the segments received at the reception terminal are not in correct order.

A value of the CWND is increased by the number of ACKs received for each round trip time (RTT). The RTT represents a round-trip delay time measured between a transmission terminal and a reception terminal. The transmission terminal compares its CWND with an advertised window (AWND) indicative of a current buffer size of the reception terminal, and transmits a data segment based on a smaller one of them. That is, the transmission terminal transmits a segment using Min(CWND, AWND). A value of the AWND is reported from the reception terminal to the transmission terminal, and its maximum value is, for example, 64 Kbytes, and is used for flow control of the reception terminal.

The CWND of a transmission terminal is initialized to '1' when TCP is initially connected and a segment loss occurs due to congestion, and its value is increased by one each time one ACK is received from a reception terminal. Therefore, the number of segments that the transmission terminal can transmit is exponentially increased, for example, increased to 2, 4, 8, and 16. In this manner, the Slow Start exponentially increases CWND, thereby rapidly approaching an available bandwidth of the network.

When the CWND reaches a Slow Start threshold SSTHRESH, the Congestion Avoidance 82 starts. The Congestion Avoidance 82 recovers a segment loss that occurred due to the end of the Slow Start 80 or congestion, and then linearly increases CWND by one for each RTT. In the Congestion Avoidance mode, CWND is increased by 1/CWND each time an ACK is received. CWND exponentially increases in the Slow Start 80, whereas CWND linearly increases in the Congestion Avoidance 82. That is, the Slow Start 80 increases CWND by the number of ACKs received for one RTT, whereas the Congestion Avoidance 82 increases CWND by 1 for one RTT.

Although the Sow Start 80 and the Congestion Avoidance 82 are separate algorithms, they are implemented together in TCP. That is, in the Slow Start 80, if a value of CWND is larger than a Slow Start threshold SSTHRESH, the Congestion Avoidance 82 is used. A segment lost in TCP is recovered by retransmission timeout or Fast Retransmit 84.

In the Slow Start mode 80 or the Congestion Avoidance mode 82, timeout occurs if no response is received from a reception terminal until a retransmission timer expires after the retransmission timer (set to 500 ms, for example) is activated each time a data segment is transmitted. If timeout occurs, CWND is set to 1 and the Slow Start 80 is restarted.

The Fast Retransmit 84 is used when a predetermined number of duplicate ACKs are received. In the Fast Retransmit 84, if a predetermined number of duplicate ACKs are received, it is regarded that a segment having a corresponding sequence number is lost, and an expected lost segment is retransmitted, thereby preventing timeout from occurring. That is, if as many consecutive duplicate ACKs as a retransmission threshold or larger are received, a transmission terminal immediately retransmits a corresponding segment regardless of whether a retransmission timer expires or not. Usually, the retransmission threshold is set to 3.

After an expected lost segment is retransmitted in the Fast Retransmit 84, a Fast Recovery mode 86 starts. In the Fast Recovery mode 86, CWND is increased each time a duplicate ACK is received, and a new segment is transmitted based on the increased CWND. When an ACK for the expected lost segment is received, the Fast Recovery 86 ends and the Congestion Avoidance mode 82 starts. The Fast Recovery mode 86 is efficient, especially when a bandwidth-delay product (BDP) is large. When the Fast Recovery mode 86 is not used, the Congestion Avoidance mode 82 starts after the Fast Retransmit 84.

Figure 4:
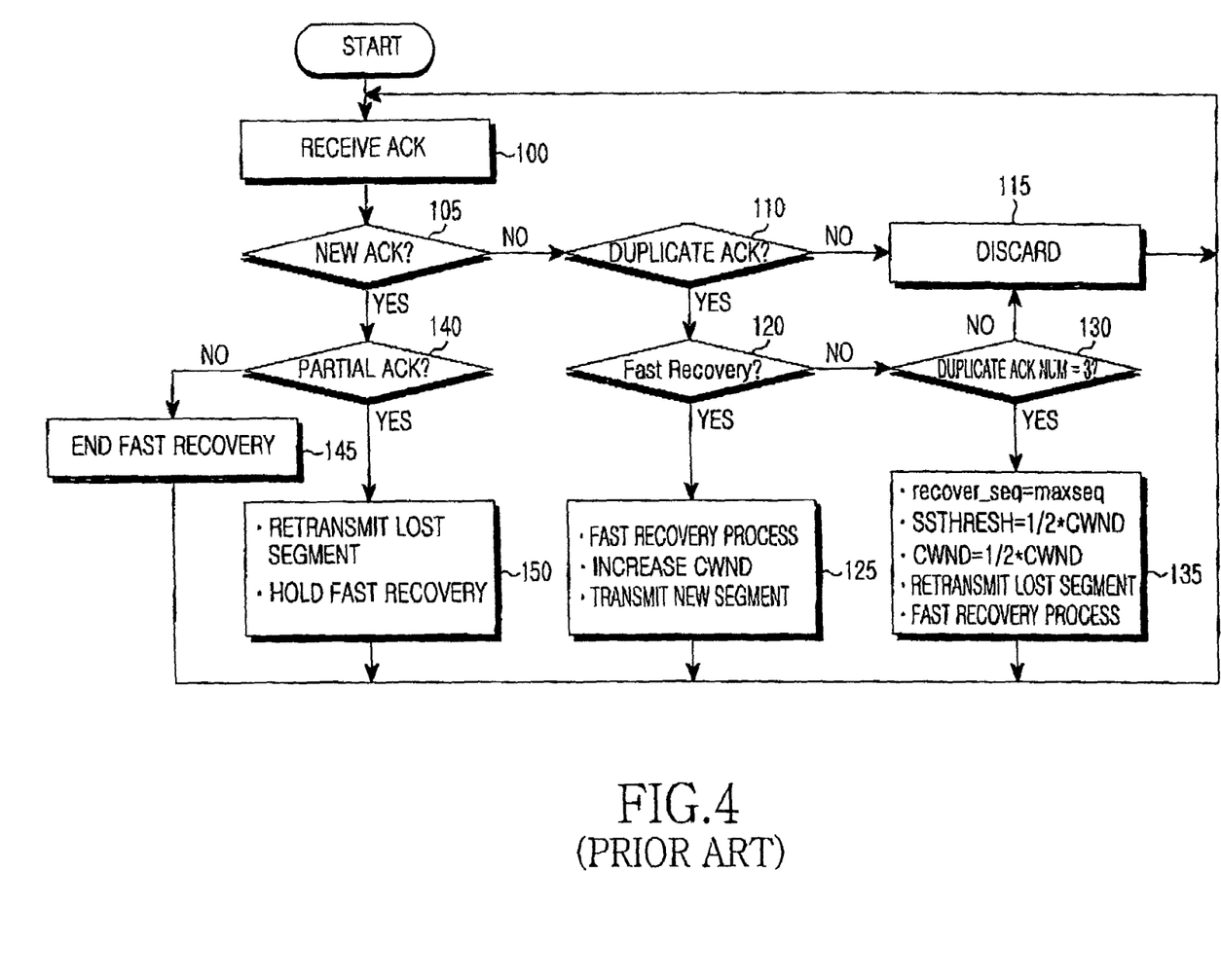
FIG. 4 is a flowchart illustrating a conventional TCP congestion control operation.

FIG. 4 is a flowchart illustrating a congestion control operation based on the above-described conventional Transmission Control Protocol (TCP), particularly based on Newreno TCP. This congestion control operation is performed by a transmission terminal.

Referring to FIG. 4, if an ACK is received from a reception terminal in step 100, a transmission terminal determines in step 105 whether a sequence number of the ACK is identical to a sequence number of a previously received ACK, to thereby check whether the ACK is a new ACK. If the ACK is not a new ACK, the transmission terminal proceeds to step 110, otherwise the transmission terminal proceeds to step 140.

In step 110, the transmission terminal determines whether the ACK is a duplicate ACK. The "duplicate ACK" refers to a received ACK having the same sequence number as a sequence number of a previously received ACK. If the ACK is not a duplicate ACK, the transmission terminal discards the received ACK in step 115, determining that an error has occurred. However, if the ACK is a duplicate ACK, the transmission terminal determines in step 120 whether a current state is a Fast Recovery mode. If the current mode is not a Fast Recovery mode, the transmission terminal determines in step 130 whether the number of received duplicate ACKs has reached 3.

If the number of received duplicate ACKs has reached a retransmission threshold of 3, the transmission terminal proceeds to step 135 where it updates a parameter recover_seq for checking end of the Fast Recovery mode to a maxseq value indicating a maximum value among sequence numbers transmitted up to the present, sets both a Slow Start threshold SSTHRESH and a congestion window CWND to ½, and retransmits a segment corresponding to a sequence number of the duplicate ACK (enter Fast Recovery mode after Fast Retransmit). The recover_seq is updated to the maxseq value each time 3 duplicate ACKs are received. That is, the recover_seq is a maximum sequence number among sequence numbers of segments transmitted until the transmission terminal enters the Fast Recovery mode. The Fast Recovery mode ends when recovery for all lost segments is completed. This is defined as a time when the transmission terminal has received an ACK having a value larger than the parameter recover_seq.

If it is determined in step 130 that the number of received duplicate ACKs is not 3, the transmission terminal proceeds to step 115 where it disregards the received ACK. If it is determined in step 120 that the current mode is the Fast Recovery mode, the transmission terminal proceeds to step 125 where it increases CWND and transmits a new data segment based on the increased CWND. Increasing CWND in the Fast Recovery mode prevents the occurrence of timeouts due to a reduction in the number of received ACKs because the number of recently transmitted data segments is exceedingly small.

CWND is set to a value larger than or equal to '(previously transmitted maximum sequence number)–(sequence number of recently received ACK)+1'. If a duplicate ACK is continuously received, the transmission terminal can no longer transmit a new segment, which indicates a decrease in the ability to receive a new ACK. Therefore, in the Fast Recovery mode, when a duplicate ACK is received, the transmission terminal increases the number (or CWND) of segments that can be simultaneously transmitted without receiving an ACK, thereby increasing the number of feedback ACKs.

In step 140, the transmission terminal determines whether the new ACK is a partial ACK, based on the recover_seq. That is, if a sequence number of the currently received new ACK is not larger than recover_seq, the transmission terminal determines the new ACK to be a partial ACK. As for the partial ACK, assuming that when a transmission side is transmitted in $1^{st}$ to $20^{th}$ segments, for example, the $10^{th}$ and $16^{th}$ segments are lost, then the transmission terminal retransmits the $10^{th}$ segment upon receiving a duplicate ACK for the $10^{th}$ segment three times. When the reception terminal correctly receives the $10^{th}$ segment, the transmission terminal waits for an ACK for the $20^{th}$ or later segment (for recover_seq=20). However, the transmission terminal receives an ACK for the lost $16^{th}$ segment, and an intermediate ACK generated due to the $16^{th}$ segment is called a "partial ACK."

If the new ACK is not a partial ACK, the transmission terminal proceeds to step 145 where it ends the Fast Recovery mode if the Fast Recovery mode is in operation otherwise it maintains a current mode (Slow Start mode or Congestion Avoidance mode). If it is determined in step 140 that the new ACK is a partial ACK, the transmission terminal proceeds to step 150 where it retransmits a lost segment and maintains the Fast Recovery mode if the Fast Recovery mode is in operation.

The congestion control operation described with reference to FIG. 4 is disadvantageous in that timeout frequently occurs in an environment having a high segment loss rate. In order to resolve such a problem, several methods are proposed in embodiments of the present invention. In a communication system using Transmission Control Protocol, in order to prevent a waste of a transmission bandwidth due to timeouts, an embodiment of the present invention provides a Duplicate Acknowledgement Counting (DAC) method and an Extended Fast Recovery (EFR) method. The Duplicate Acknowledgement Counting uses parameters that are added to control a flow of a segment in a transmission terminal, and the Extended Fast Recovery updates a reference for determining a partial ACK, for each retransmission.

According to the Duplicate Acknowledgement Counting method, the transmission terminal calculates the expected number of duplicate ACKs that are received when retransmission is successfully made after retransmitting a lost segment, and records the calculated value. The transmission terminal records the number of duplicate ACKs received after a segment loss. If the number of received duplicate ACKs is larger than the expected number of duplicate ACKs, the transmission terminal immediately performs retransmission and determines that a retransmitted segment is lost.

In the Duplicate Acknowledgement Counting method, if the number of received duplicate ACKs is smaller than or equal to the expected number of duplicate ACKs, the transmission terminal re-calculates the expected number of duplicate ACKs, records the re-calculated value, and records the number of recently received duplicate ACKs based on this time. If a normal ACK is received, the transmission terminal initializes parameters related the DAC algorithm, i.e., the expected number of duplicate ACKs and the number of duplicate ACKs, ends the Fast Recovery, and then performs the Congestion Avoidance mode. The "normal ACK" refers to a new ACK having a sequence number following a sequence number of a previously received ACK.

Figure 5:
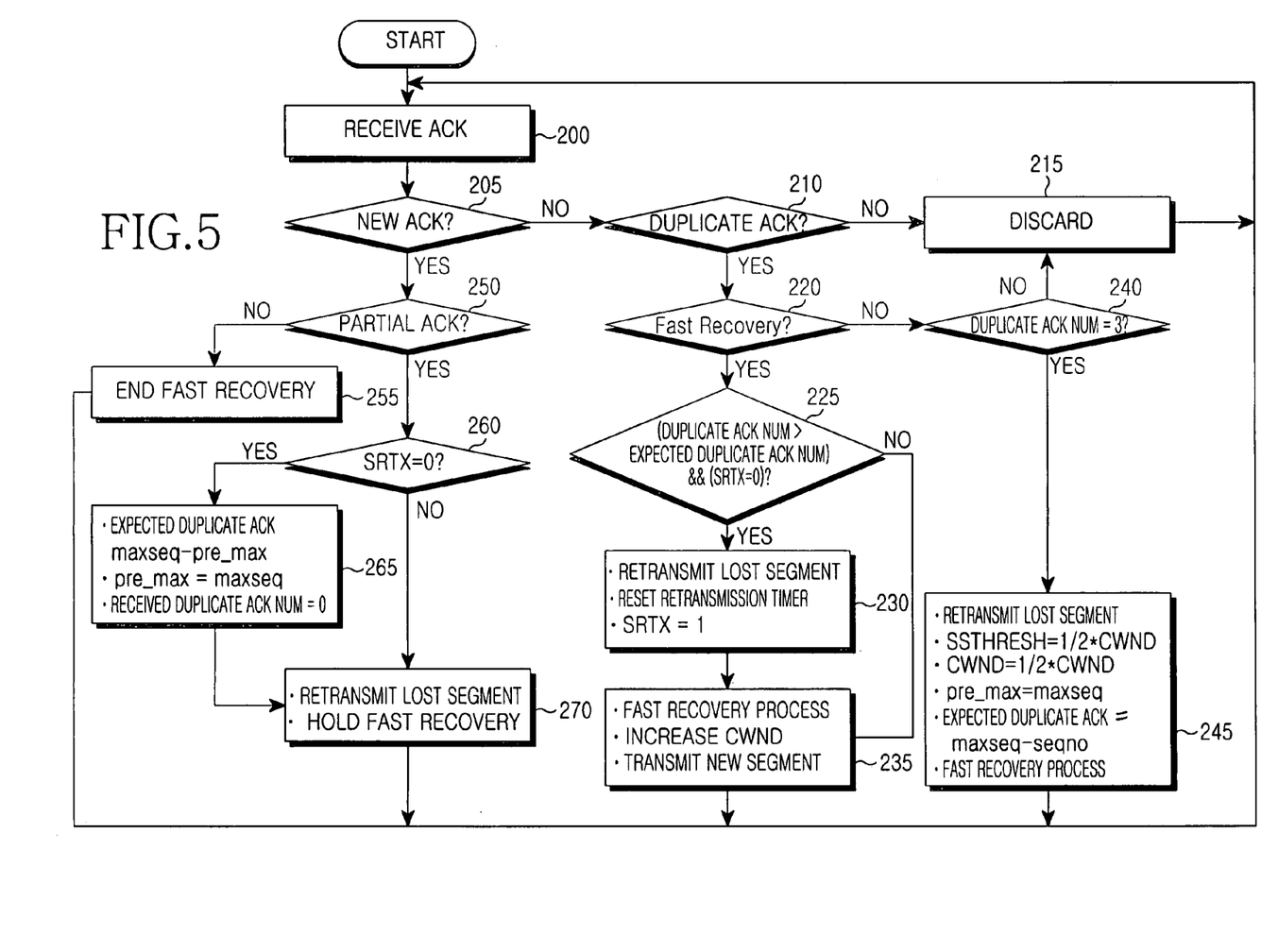
FIG. 5 is a flowchart illustrating a Duplicate Acknowledgement Counting operation for TCP congestion control according to an embodiment of the present invention.

FIG. 5 is a flowchart illustrating a Duplicate Acknowledgement Counting method for TCP congestion control according to an embodiment of the present invention. Herein, 'seqno' refers to a sequence number of a currently received ACK, 'maxseq' represents a largest value among sequence numbers transmitted up to the present, and 'pre_max' is a maxseq value to be used in calculating the expected number of duplicate ACKs. In addition, 'SRTX' is used to indicate whether to retransmit a re-lost retransmitted segment to thereby enable only one retransmission of the re-lost retransmitted segment within one window, and it is initially set to '0'.

Referring to FIG. 5, if an ACK is received from a reception terminal in step 200, a transmission terminal determines in step 205 whether a sequence number of the ACK is identical to a sequence number of a previously received ACK, to thereby check whether the ACK is a new ACK. If the ACK is not a new ACK, the transmission terminal proceeds to step 210, and if the ACK is a new ACK, the transmission terminal proceeds to step 250.

If it is determined in step 205 that the ACK is not a new ACK, the transmission terminal determines in step 210 whether the ACK is a duplicate ACK. The "duplicate ACK" refers to a received ACK having the same sequence number as a sequence number of a previously received ACK. If the ACK is not a duplicate ACK, the transmission terminal discards the received ACK in step 215, determining that an error has occurred. However, if it is determined that the ACK is a duplicate ACK, the transmission terminal determines in step 220 whether a current state is a Fast Recovery mode. If the current mode is not a Fast Recovery mode, the transmission terminal determines in step 240 whether the number of received duplicate ACKs has reached a retransmission threshold of 3.

If the number of received duplicate ACKs has reached the retransmission threshold of 3, the transmission terminal proceeds to step 245 where it sets both a Slow Start threshold SSTHRESH and a congestion window CWND to ½ of a current CWND, retransmits a segment corresponding to a sequence number of the duplicate ACK, updates a parameter pre_max representative of a previous maxseq value to a maxseq value representative of a maximum value among sequence numbers transmitted up to the present, and sets the expected number of duplicate ACKs to a value determined by subtracting seqno from maxseq (e.g., enter Fast Recovery mode after performing Fast Retransmit mode). However, if it is determined in step 240 that the number of received duplicate ACKs is not 3, the transmission terminal proceeds to step 215 where it disregards the received ACK.

If it is determined in step 220 that the current mode is the Fast Recovery mode, the transmission terminal determines in step 225 whether the number of duplicate ACKs received up to the present is larger than the expected number of duplicate ACKs and SRTX is 0. If the condition of step 225 is not satisfied, the transmission terminal proceeds to step 235. However, if the condition of step 225 is satisfied, the transmission terminal proceeds to step 230 where it retransmits a segment corresponding to a sequence number of the duplicate ACK, resets a retransmission timer, and sets SRTX to '1', and then proceeds to step 235. In step 235, the transmission terminal starts the Fast Recovery mode, increases CWND, and transmits a new data segment based on the increased CWND.

In step 250, the transmission terminal determines whether the new ACK is a partial ACK. If the new ACK is not a partial ACK, the transmission terminal proceeds to step 255 where it ends the Fast Recovery mode if the Fast Recovery mode is in operation otherwise it maintains a current mode (Slow Start mode or Congestion Avoidance mode). If the new ACK is a partial ACK, the transmission terminal determines in step 260 whether SRTX is '0'. If SRTX is '0', the transmission terminal proceeds to step 265 otherwise the transmission terminal proceeds to step 270.

In step 265, the transmission terminal sets the expected number of duplicate ACKs to a value determined by subtracting pre_max from maxseq, sets pre_max to maxseq, and clears the number of duplicate ACKs received up to the present, and then proceeds to step 270. In step 265, the retransmission timer is not reset, because it has been determined that a lost segment can be recovered. In step 270, the transmission terminal immediately retransmits a lost segment without performing the operation as many times as the retransmission threshold of 3, and maintains the Fast Recovery mode if the Fast Recovery mode is in operation.

The Extended Fast Recovery is used to recover a loss that occurred in a recently transmitted segment when a duplicate ACK is received and one more new segment is transmitted in the Fast Recovery mode. The transmission terminal updates a maximum sequence recover_seq of a segment transmitted up to the present each time a partial ACK is received in the Fast Recovery mode, and extends the Fast Recovery operation using the updated value.

Figure 6:
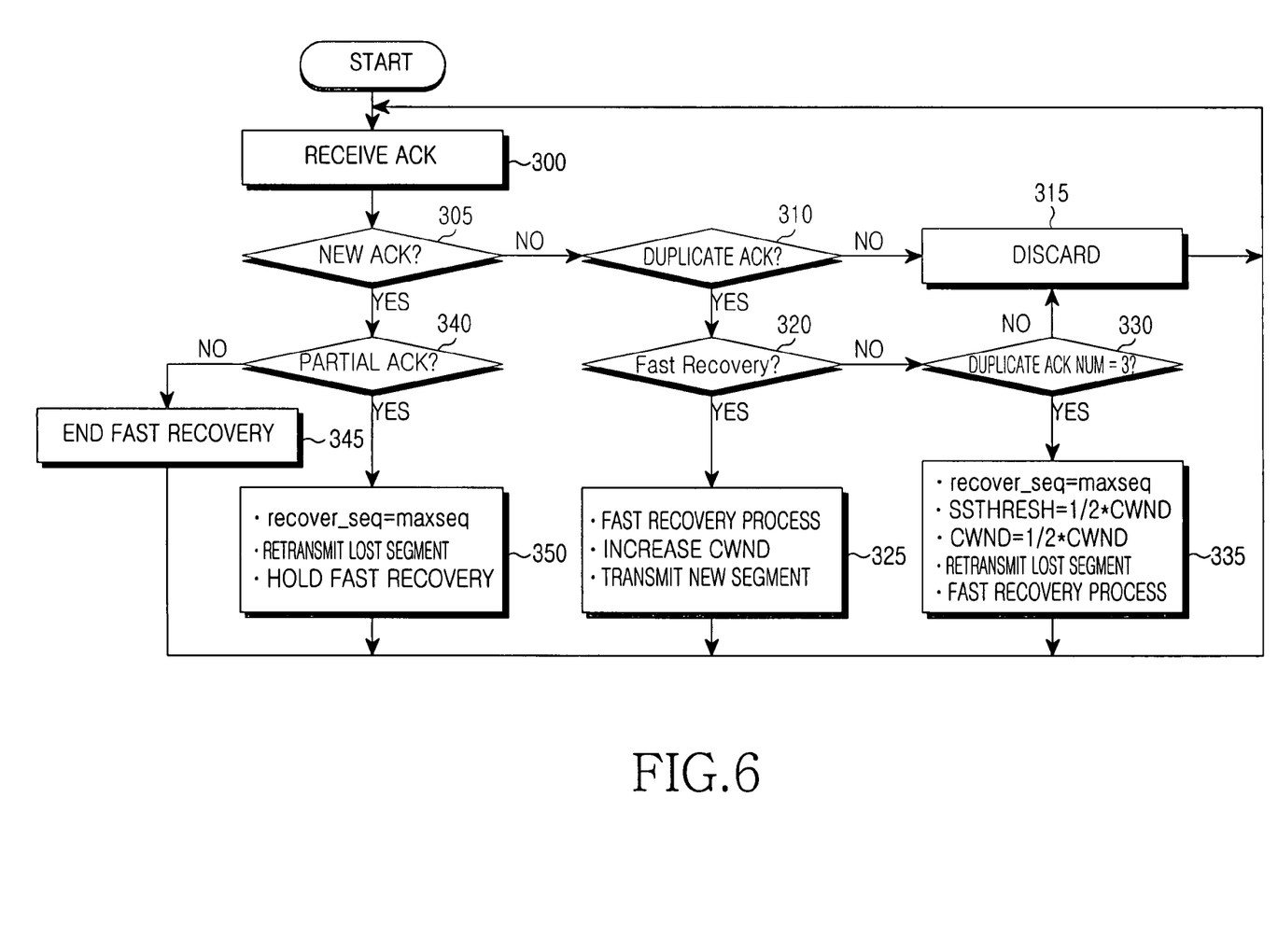
FIG. 6 is a flowchart illustrating an Extended Fast Recovery operation for TCP congestion control according to an embodiment of the present invention.

FIG. 6 is a flowchart illustrating an Extended Fast Recovery method for TCP congestion control according to an embodiment of the present invention. Herein, 'recover_seq' represents a value for determining whether the Fast Recovery mode has ended, and 'maxseq' represents the largest value among sequence numbers transmitted up to the present.

Referring to FIG. 6, if an ACK is received from a reception terminal in step 300, a transmission terminal determines in step 305 whether a sequence number of the ACK is identical to a sequence number of a previously received ACK, to thereby check whether the ACK is a new ACK. If the ACK is not a new ACK, the transmission terminal proceeds to step 310 otherwise the transmission terminal proceeds to step 340.

In step 310, the transmission terminal determines whether the ACK is a duplicate ACK. The "duplicate ACK" refers to a received ACK having the same sequence number as a sequence number of a previously received ACK. If the ACK is not a duplicate ACK, the transmission terminal discards the received ACK in step 315, determining that an error has occurred. However, if the ACK is a duplicate ACK, the transmission terminal determines in step 320 whether a current state is a Fast Recovery mode. If the current mode is not a Fast Recovery mode, the transmission terminal determines in step 330 whether the number of received duplicate ACKs has reached a retransmission threshold of 3.

If the number of received duplicate ACKs has reached 3, the transmission terminal proceeds to step 335 where it sets both a Slow Start threshold SSTHRESH and a congestion window CWND to ½ of a current CWND, retransmits a segment corresponding to a sequence number of the duplicate ACK, and updates a parameter recover_seq to a maxseq value indicating a maximum value among sequence numbers transmitted up to the present (Fast Retransmit mode). If it is determined in step 330 that the number of received duplicate ACKs is not 3, the transmission terminal proceeds to step 315 where it disregards the received ACK.

If it is determined in step 320 that the current mode is the Fast Recovery mode, the transmission terminal proceeds to step 325 where it enters the Fast Recovery mode, increases CWND, and transmits a new data segment based on the increased CWND.

In step 340, the transmission terminal determines whether the new ACK is a partial ACK. If the new ACK is not a partial ACK, the transmission terminal proceeds to step 345 where it ends the Fast Recovery mode if the Fast Recovery mode is in operation otherwise the transmission terminal maintains a current mode (e.g., Slow Start mode or Congestion Avoidance mode). If it is determined in step 340 that the new ACK is a partial ACK, the transmission terminal proceeds to step 350 where it updates recover_seq to a maxseq value indicating a maximum sequence number of a segment transmitted up to the present, retransmits a lost segment, and maintains the Fast Recovery mode if the Fast Recovery mode is in operation.

Here, updating a recover_seq value refers to setting the recover_seq value to a transmission sequence number at receipt of a partial ACK, rather than a transmission sequence number at a start of the Fast Recovery mode, thereby maintaining the Fast Recovery mode for a long period. The Fast Recovery mode ends when recovery of all segments is completed, and this can be detected by determining a time when a transmission terminal receives an ACK whose sequence number is larger than the parameter recover_seq.

As is understood from the foregoing description, in Transmission Control Protocol (TCP) using a Slow Start mode and a Congestion Avoidance mode, the embodiments of the present invention reduce the probability of retransmission timeouts thereby improving transmission performance in a network environment where many losses occur.

While the invention has been shown and described with reference to certain preferred embodiments thereof, it should be understood by those skilled in the art that various changes in form and details may be made therein without departing from the spirit and scope of the invention as defined by the appended claims.

What is claimed is:

1. A congestion control method in a communication system that transmits and receives a data segment using Transmission Control Protocol (TCP) and performs a Fast Retransmit mode and a Fast Recovery mode upon occurrence of a lost segment, comprising the steps of:

retransmitting, by a transmission terminal, the lost segment to a reception terminal and then calculating the expected number of duplicate acknowledgements (ACKs) expected to be received from the reception terminal;

determining by the transmission terminal whether an ACK currently received from the reception terminal is identical to a new ACK or a duplicate ACK;

accumulating, by the transmission terminal, the received duplicate ACK, and comparing the number of the accumulated duplicate ACKs with the expected number of die duplicate ACKs; and retransmitting the lost segment to the reception terminal by the transmission terminal if the number of the accumulated duplicate ACKs is larger than the expected number of the duplicate ACKs, wherein the calculation step comprises the step of calculating the expected number of duplicate ACKs by subtracting a sequence number (seqno) of an ACK currently received by the transmission terminal from a maximum value maximum sequence (maxseq) among sequence numbers of segments transmitted up to the present to the reception terminal by the transmission terminal.

2. The congestion control method of claim 1, further comprising the step of increasing, byte transmission terminal, a size of a congestion window in the Fast Recovery mode after performing the retransmission step, and transmitting a new segment to the reception terminal.

3. The congestion control method of claim 1, further comprising the step of immediately increasing, by the transmission terminal, a size of a congestion window in the Fast Recovery mode and transmitting a new segment to the reception terminal if the number of the accumulated duplicate ACKs is smaller than or equal to the expected number of the duplicate ACKs.

4. The congestion control method of claim 1, further comprising the step of updating, by the transmission terminal, the expected number of the duplicate ACKs if a currently received ACK is identical to the new ACK and the currently received ACK is also identical to a partial ACK caused by a loss of another segment.

5. The congestion control method of claim 4, wherein the partial ACK is an ACK corresponding to a case where a sequence number of a new ACK received by the transmission terminal after retransmission of the segment is smaller than or equal to a maximum value among sequence numbers of segments transmitted by the transmission terminal until a retransmission time of the segment.

6. The congestion control method of claim 4, wherein the updating step comprises the step of updating the expected number of the duplicate ACKs to a value determined by subtracting a maximum value pre-maximum (pre_max) among sequence numbers of segments transmitted before retransmission of the lost segment from a maximum value maximum sequence (maxseq) among sequence numbers of segments transmitted up to the present by the transmission terminal.

7. The congestion control method of claim 4, further comprising the step of initializing, by the transmission terminal, the number of the accumulated duplicate ACKs after updating the expected number of duplicate ACKs.

8. The congestion control method of claim 1, further comprising the step of initializing the expected number of the duplicate ACKs and the number of the accumulated duplicate ACKs and transmitting a new data segment by a Congestion Avoidance mode if a normal ACK is received before the number of the accumulated duplicate ACKs has reached the expected number of the duplicate ACKs.

9. The congestion control method of claim 1, further comprising the step of initializing a timer for the retransmission in the retransmission step by the transmission terminal.

10. A congestion control method in a communication system that transmits and receives a data segment using Transmission Control Protocol (TCP) and performs a Fast Retransmit mode and a Fast Recovery mode upon occurrence of a lost segment, comprising the steps of:
   initializing, by a transmission terminal, a recovery sequence number for determining whether the Fast Recovery mode ends to a maximum value of segment numbers counted until a start point of the Fast Retransmit mode;
   receiving, by the transmission terminal, an ACK indicating whether a segment is received from a reception terminal; and
   updating, by the transmission terminal, the recovery sequence number to a maximum number among sequence numbers of segments transmitted to the reception terminal until a reception point of the ACK, if the ACK is a partial ACK, a sequence number of the ACK being smaller than the recovery sequence number,
   wherein the ACK is a duplicate ACK having the same sequence number as a sequence number of a previously received ACK, and when the Fast Recovery mode is in operation, the transmission terminal increases a congestion window before transmitting a new segment.

11. The congestion control method of claim 10, wherein the ACK is a partial ACK generated after retransmission of the lost segment.

12. The congestion control method of claim 10, wherein the transmission terminal ends the Fast Recovery mode if a sequence number of the ACK is larger than the recovery sequence number of the segment for determining whether the Fast Recovery mode ended.

13. The congestion control method of claim 10, wherein the transmission terminal retransmits the lost segment that caused the partial ACK after updating the recovery sequence.

14. A system for congestion control in a communication system that transmits and receives a data segment using Transmission Control Protocol (TCP) and performs a Fast Retransmit mode and a Fast Recovery mode upon occurrence of a lost segment, the system comprising:
   a reception terminal, and;
   a transmission terminal is adapted to retransmit the lost segment to the reception terminal and calculate the expected number of duplicate acknowledgements (ACKs) expected to be received from the reception terminal, determine whether an ACK currently received from the reception terminal is identical to a new ACK or a duplicate ACK, accumulate the received duplicate ACK, compare the number of the accumulated duplicate ACKs with the expected number of the duplicate ACKs, and retransmit the lost segment to the reception terminal if the number of the accumulated duplicate ACKs is larger than the expected number of the duplicate ACKs,
   wherein the transmission terminal is further adapted to calculate the expected number of duplicate ACKs by subtracting a sequence number (seqno) of an ACK currently received from a maximum value maximum sequence (maxseq) among sequence numbers of segments transmitted up to the present to the reception terminal.

15. The system of claim 14, wherein the transmission terminal is further adapted to increase a size of a congestion window in the Fast Recovery mode after retransmitting the lost segment to the reception terminal, and transmitting a new segment to the reception terminal.

16. The system of claim 14, wherein the transmission terminal is further adapted to immediately increase a size of a congestion window in the Fast Recovery mode and transmitting a new segment to the reception terminal if the number of the accumulated duplicate ACKs is smaller than or equal to the expected number of the duplicate ACKs.

17. The system of claim 14, wherein the transmission terminal is further adapted to update the expected number of the duplicate ACKS if a currently received ACK is identical to the new ACK and the currently received ACK is also identical to a partial ACK caused by a loss of another segment.

18. The system of claim 17, wherein the partial ACK is an ACK corresponding to a case where a sequence number of a new ACK received by the transmission terminal after retransmission of the segment is smaller than or equal to a maximum value among sequence numbers of segments transmitted by the transmission terminal until retransmission of the segment.

19. The system of claim 17, wherein the transmission terminal is further adapted to update the expected number of the duplicate ACKs to a value determined by subtracting a maximum value pre maximum (pre_max) among sequence numbers of segments transmitted before retransmission of the lost segment from a maximum value maximum sequence (max-seq) among sequence numbers of segments transmitted up to the present by the transmission terminal.

20. The system of claim 17, wherein the transmission terminal is further adapted to initialize the number of the accumulated duplicate ACKs after updating the expected number of duplicate ACKs.

21. The system of claim 14, wherein the transmission terminal is further adapted to initialize the expected number of the duplicate ACKs and the number of the accumulated duplicate ACKs and transmit a new data segment by a Congestion Avoidance mode if a normal ACK is received before the number of the accumulated duplicate ACKs has reached the expected number of the duplicate ACKs.

22. The system of claim 14, wherein the transmission terminal initializes a timer for the retransmission after retransmitting the lost segment.

* * * * *